United States Patent
Preller

(10) Patent No.: US 6,208,532 B1
(45) Date of Patent: Mar. 27, 2001

(54) SWITCHED-MODE POWER SUPPLY THAT CLOCK-PULSE CONTROLS A SWITCHING ELEMENT FOR SUPPLYING A RECTIFIED AC VOLTAGE TO A PRIMARY WINDING OF A TRANSFORMER OF THE POWER SUPPLY

(75) Inventor: Peter Preller, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/322,716

(22) Filed: May 28, 1999

Related U.S. Application Data

(63) Continuation of application No. PCT/DE97/02680, filed on Nov. 14, 1997.

(30) Foreign Application Priority Data

Nov. 28, 1996 (DE) .............................................. 196 49 403

(51) Int. Cl.⁷ .................................................. H02M 3/335
(52) U.S. Cl. ............................................................. 363/21
(58) Field of Search .............................. 363/21; 323/274, 323/281

(56) References Cited

U.S. PATENT DOCUMENTS 4,646,319 * 2/1987 Engel et al. ..................... 340/310.06

FOREIGN PATENT DOCUMENTS

| | | |
|---|---|---|
| 3501052A1 | 7/1986 | (DE) . |
| 4407709A1 | 9/1995 | (DE) . |
| 9410995 | 9/1995 | (DE) . |
| 0018186A1 | 10/1980 | (EP) . |
| 0332095A2 | 9/1989 | (EP) . |
| 0653831A1 | 5/1995 | (EP) . |
| 0778659A2 | 6/1997 | (EP) . |

OTHER PUBLICATIONS

Japanese Patent Abstract No. 59–178969 (Kouno), dated Oct. 11, 1984.

* cited by examiner

Primary Examiner—Shawn Riley
(74) Attorney, Agent, or Firm—Herbert L. Lerner; Laurence A. Greenberg; Werner H. Stemer

(57) ABSTRACT

The switched-mode power supply has a transformer with an E-shaped core. Each side limb of the core is surrounded by a winding. The flow of current through the secondary winding is controlled by the output voltage to be regulated. A control signal for controlling the switching frequency of the power supply is decoupled at the primary side winding. This makes it possible to dispense with an optical coupler which would otherwise be necessary.

6 Claims, 1 Drawing Sheet

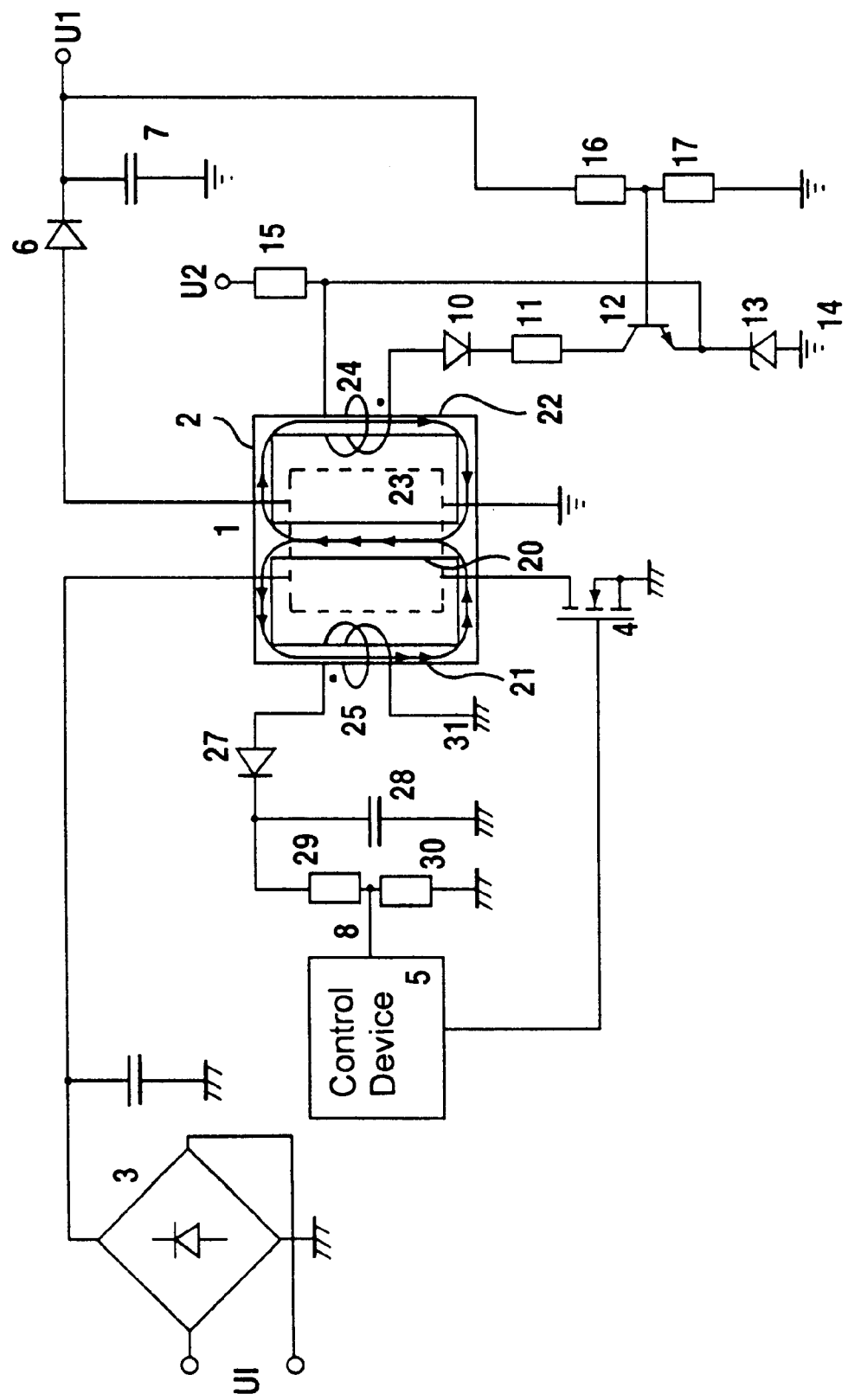

SWITCHED-MODE POWER SUPPLY THAT CLOCK-PULSE CONTROLS A SWITCHING ELEMENT FOR SUPPLYING A RECTIFIED AC VOLTAGE TO A PRIMARY WINDING OF A TRANSFORMER OF THE POWER SUPPLY

CROSS-REFERENCE TO RELATED APPLICATION

This is a continuation of copending International application PCT/DE97/02680, filed Nov. 14, 1997, which designated the United States.

BACKGROUND OF THE INVENTION

FIELD OF THE INVENTION

The invention lies in the electrical and electronics fields. Specifically, the invention pertains to a switched-mode power supply with a switching element through which a rectified AC voltage can be applied to a primary winding of a transformer, at the secondary winding of which a rectified output voltage to be controlled can be tapped. The power supply further has a control device through which the switching element can be clock-pulse controlled in dependence on a control signal. The transformer contains an E-shaped core with a middle limb surrounded by the primary and the secondary winding.

Switched-mode power supplies are known devices used to generate one or more different load-independent DC output voltages from a single rectified AC mains voltage. For this purpose the primary side rectified AC voltage is applied in a clocked manner over a switching element to the primary winding of a transformer. The output voltage can be tapped at the secondary winding after rectification and smoothing.

The output voltage is regulated through the clock-pulse control or duty cycle of the switching element. In German published patent application DE 44 07 709 this is done by tapping a control signal from an additional primary winding, whereby regulation of the clock frequency and thus of the secondary side output voltage are dependent on the control signal. The inadequate coupling between the primary side control winding and the secondary side load winding is problematical. The result is that the output voltage cannot be held sufficiently constant at load changes.

A so-called current pump for sinusoidal current input is provided in the circuit disclosed in the afore-mentioned document. Influences of the mains frequency are amplified through the current pump. A mains system hum is therefore superimposed on the output voltage and the mains system hum cannot be completely compensated because the control voltage is tapped on the primary side.

As a remedy, the control voltage can be tapped on the secondary side, as shown for example in the German utility model (Gebrauchsmuster) G 94 10 995. An optical coupler is necessary for the transmission of the control signal to the control device on the primary side. An optical coupler module is relatively costly, however, and that solution is therefore uneconomical.

SUMMARY OF THE INVENTION

It is accordingly an object of the invention to provide a switched-mode power supply unit, which overcomes the above-mentioned disadvantages of the heretofore-known devices and methods of this general type and which can be manufactured at low cost and which provides as well-regulated an output voltage as possible.

With the foregoing and other objects in view there is provided a switched-mode power supply. The power supply includes a transformer having a primary winding receiving a rectified AC voltage and a secondary winding outputting a rectified output voltage. The transformer has an E-shaped core with a middle limb surrounded by the primary winding and the secondary winding. The E-shaped core also has a first outer limb and a second outer limb. A first winding is provided around the first outer limb for conducting a current controlled in dependence on the output voltage, and a second winding is provided around the second outer limb for generating a control signal. The power supply also includes a switching element connected to the primary winding of the transformer for supplying a rectified AC voltage to the primary winding, and a control device connected to the switching element for clock-pulse controlling the switching element in dependence on the control signal.

The switched-mode power supply described by the invention does not require an optical coupler. Transmission of the control information from the secondary to the primary side is performed through asymmetric displacement of the magnetic field of the transformer between the outer limbs of the transformer core. The leads for the control signal start directly at the output voltage to be regulated, so that both load changes and mains system hum are well compensated. The windings to be attached to the outer limbs are generally simple enough to be produced by automatic equipment and are therefore economical.

Other features which are considered as characteristic for the invention are set forth in the appended claims.

Although the invention is illustrated and described herein as embodied in switched-mode power supply with feedback control of the output voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE is a circuit schematic of a switched-mode power supply which generates a regulated output voltage U1 from an input side mains AC voltage UI.

DESCRIPTION OF THE PREFERRED EMBODIMENTS

The switched-mode power supply includes a transformer 1 with an E-shaped transformer core 2. The core 2 has a middle limb 20 with primary and secondary windings 23. The middle limb 20 preferably contains an air gap aligned transversely to the longitudinal direction of the limb. The mains AC voltage rectified through a bridge rectifier 3 is conducted in clocked fashion to the primary winding by means of a switching transistor 4. The switching transformer 4 is controlled by a control device 5 for control of its on-state and off-state phases, i.e., its duty cycle. Connected to the secondary winding are a rectifier diode 6 and a smoothing capacitor 7 to which the output voltage U1 is connected. In order that the output voltage U1 is held as constant as possible independent of load, a control signal is led to the control device 5 at a connection 8. Clock control of the switching transistor 4 operates dependent on this. For switched-mode power supplies according to the free-running principle, the on-state duration of the switching transistor 4 is determined by the control signal. The off-state duration is determined through the demagnetization state of the transformer. In fixed frequency operation the pulse duty ratio of the switch-on clock pulse is determined by the control signal.

The control signal at connection 8 of the control device 5 is tapped on the secondary side and transferred to the primary side over the transformer 1. For this purpose a winding 24 is provided, which is wound on an outer limb 22 of the E-shaped transformer core. Winding 24 is connected on the secondary side. A winding 25 is arranged around the other outer limb 21 of the E-shaped transformer core. The winding 25 is connected on the primary side for decoupling the control signal. Control information is transmitted from the primary side to the secondary side in that the current through the winding 24 is modulated on the secondary side, whereby the magnetic field is correspondingly displaced asymmetrically between the outer limbs 21, 22, of the transformer and thus a corresponding modulated voltage signal is tapped at the winding 25 on the primary side. As a result of the air gap in the middle limb of the transformer the magnetic resistance of this is increased and the displacement of the magnetic field is assisted.

The connections of the secondary side winding 24 are connected together to form a circuit over a diode 10, a current-limiting resistor 11 and the collector-emitter path of a bipolar transistor 12. A MOS transistor can also be used instead of a bipolar transistor. The emitter of the transistor 12 (or the source connection of an appropriate MOS transistor) is connected over a Zener diode 13 to a secondary ground connection 14 and over a resistor 15 to a connection for an additional voltage U2 generated on the secondary side. The base of the transistor 12 is controlled through a voltage divider 16, 17 by the output voltage U1 to be regulated. If the signal derived from the output voltage U1 over the voltage divider 16, 17 becomes greater than the threshold voltage formed by the Zener diode 13 and the transistor 12, the winding 24 is short-circuited over the elements 10, 11, 12. Operating point adjustment of the Zener diode is performed by feeding a current to it from the voltage U2 over the resistor 15. If the switched-mode power supply is used in a television set, for instance, the voltage U2 is low. Otherwise it is a voltage sufficient to supply signal processing circuits and is in the vicinity of 10 volt. The voltage U1 is the voltage normally provided for controlling the line output stage of the picture tube and lies between 120 and 150 volt.

Without taking into account the windings 24, 25 around the side limbs of the transformer core, the magnetic field generated in the core by the primary winding around the middle limb is distributed symmetrically between the two side limbs 21 and 22. Short-circuiting the winding 24 over elements 10, 11, 12 results in the magnetic field generated by the primary winding around the middle limb 20 being distributed asymmetrically between the side limbs 22, 21. In the exemplary embodiment the winding 24 is so oriented that the magnetic field is reduced in the associated limb 22 of the transformer core. The point marked at the end of the winding means that this is the positive pole of the voltage induced in the winding 24 during the off-state phase of the switching transistor. As a result of the current induced in the winding 24 the magnetic field directed through the limb 24 is reduced and instead of this displaced into the limb 21.

As a result the voltage induced in the winding 25 is increased. This is decoupled at a connection of the winding 25 over a rectifier diode 27 and a smoothing capacitor 28, and led over a voltage divider 29, 30 to the connection 8 of the control device 5 for the control signal. The other connection of the winding 25 is connected with the primary ground 31. The winding 25 is so oriented that the positive pole of the induced voltage is at the connection on the rectifier side during the off-state phase of the switching transistor 4, this being marked in the figure with a point.

Whereas during the off-state phase the positive voltage pole for the winding 24 arises at the winding connection facing the secondary ground connection, the positive voltage pole for the winding 25 arises at the winding connection facing away from the primary ground connection. The windings 24, 25 have opposite winding orientations.

The number of turns of the winding 24 depends on the necessary current required for driving the connected components and also on the extent to which it is required that the magnetic field be displaced in the side limbs. It has been found that with increasing numbers of turns, the current through the winding 24 decreases and the impedance of the winding becomes greater, whereby the effect of the magnetic field displacement increases. The number of turns of the winding 25 depends on the amplitude of the control signal necessary for further processing.

During the start-up phase of the switched-mode power supply the voltage U1 is lower than the threshold voltage set through the Zener diode 13 in combination with the base emitter line of the transistor 12. The transistor 12 is in the off-state and no current flows through the winding. The magnetic field in the transformer is divided symmetrically between the two side limbs 21, 22. A low voltage is generated at the winding 25 so that the control device 5 is caused to clock-pulse control the switching transistor in such a way that the output voltage U1 increases. If the output voltage U1 is greater than the threshold value formed over the transistor 12 and the Zener diode 13, the winding 24 is short-circuited over the elements 10, 11, 12 with the outcome that a higher magnetic field is generated in the limb 21 of the transformer core that in the limb 22, and that consequently a higher voltage is induced in the winding 25. For the control signal at connection 8 of the control device 5 this means that the transistor 4 is clock-pulse controlled in such a way that the voltage U1 decreases again until the voltage U1 falls below the switching threshold formed through the transistor 12 and the Zener diode 13. The build-up process continues until the signal derived from the voltage U1 over the voltage divider 16, 17 is equal to the switching threshold formed by the transistor 12 and the Zener diode 13. The transistor is then connected in a moderately conducting state, i.e. less conducting than in the full on-state and more conducting than in the off-state. In the winding 25 a control voltage is then induced which is sufficient to maintain this state. The output voltage U1 is constantly compensated. The voltage regulation has thus settled.

The control signal is transmitted from the secondary to the primary side only during the off-state phase of the switching transistor 4. Signal transmission is also available during the flux phase, while the switching transistor is conductively connected. It is then advantageous to transmit information from the primary to the secondary side using the same windings 25, 24, which information is coupled on the primary side to the winding 25 with corresponding circuits as provided for the winding 24, and is decoupled on the secondary side at the winding 24. A suitable example for transmitting information would be a remote-control signal which is received by a primary side infrared detector and receiver, and evaluated by a secondary side command decoder supplied with voltage.

I claim:

1. Switched-mode power supply, comprising:

a transformer having a primary winding receiving a rectified AC voltage and a secondary winding outputting a rectified output voltage, said transformer having an E-shaped core with a middle limb surrounded by said primary winding and said secondary winding and with a first outer limb and a second outer limb;

a first winding around said first outer limb for conducting a current controlled in dependence on the output voltage, and a second winding around said second outer limb for generating a control signal;

a switching element connected to said primary winding of said transformer for supplying a rectified AC voltage to said primary winding; and a control device connected to said switching element for clock-pulse controlling said switching element in dependence on the control signal.

2. The switched-mode power supply according to claim 1, which further comprises a secondary side current path including said first winding and a transistor controlled by the output voltage.

3. The switched-mode power supply according to claim 1, wherein said first winding has terminals, and including a diode, a resistor, and a transistor with a main current path connected between said terminals of said first winding, a resistor connecting one of an emitter and a source terminal of said transistor to a secondary side generated DC voltage, a Zener diode connecting said transistor with secondary ground, and a voltage divider connected between the output voltage and said transistor such that said transistor is controlled by the voltage to be regulated.

4. The switched-mode power supply according to claim 1, wherein said second winding has one end coupled with primary ground and a further end, and including rectification and smoothing means connected to said further end and outputting the control signal.

5. The switched-mode power supply according to claim 1, wherein said first winding and said second winding are wound in mutually opposite winding orientations.

6. The switched-mode power supply according to claim 1, wherein said middle limb of said transformer is formed with an air gap.

* * * * *